United States Patent [19]

Sisk

[11] Patent Number: 5,387,015
[45] Date of Patent: Feb. 7, 1995

[54] HOPPER TEE

[76] Inventor: David E. Sisk, 7353 Hillsboro Rd., Bonne Terre, Mo. 63628

[21] Appl. No.: 178,732

[22] Filed: Jan. 10, 1994

[51] Int. Cl.6 ............................................. F16L 9/14
[52] U.S. Cl. ..................................... 285/55; 285/156; 285/422
[58] Field of Search ................................ 285/156, 422

[56] References Cited

U.S. PATENT DOCUMENTS

| | | | |
|---|---|---|---|
| 1,255,562 | 2/1918 | Olson | 285/156 |
| 2,039,542 | 5/1936 | Lindquist | 285/156 |
| 2,470,499 | 5/1949 | Lapp | 285/156 V |
| 4,848,396 | 7/1989 | Sisk . | |
| 5,104,155 | 4/1992 | Kirkwood | 285/156 |

FOREIGN PATENT DOCUMENTS

| | | | |
|---|---|---|---|
| 654037 | 3/1929 | France | 285/156 |
| 28708 | of 1909 | United Kingdom | 285/156 |

*Primary Examiner*—Dave W. Arola
*Attorney, Agent, or Firm*—Paul M. Denk

[57] ABSTRACT

A one piece cast hopper tee having a vertically directed hollow pipe section with a flange at an upper end thereof for attachment to the bottom of a hopper truck. The bottom end of the vertical pipe section flares outward at the juncture with a generally horizontal pipe section creating a generally elliptical opening from the vertical pipe into the horizontal pipe. In the area of juncture between the two pipes smooth and uninterrupted internal transition surfaces are provided to permit complete and continuous flow of product from the vertical pipe to the horizontal pipe. A pair of wear saddles, one on each side of the external juncture of the flared section of vertical pipe with the horizontal pipe create wear resistant areas having approximately double the wall thickness of the pipe sections. A substantially thicker wall section is formed in the horizontal pipe opposite the elliptical opening.

4 Claims, 2 Drawing Sheets

HOPPER TEE

BACKGROUND OF THE INVENTION

This invention relates generally to hopper tees, and more particularly to a one-piece cast hopper tee having a flared vertical pipe section at the juncture of the vertical pipe section and horizontal pipe sections creating an elliptical opening from the vertical pipe into the horizontal pipe that allows greater flow of product through the hopper tee.

Hoppers or tank trailers are commonly used to transport bulk commodities such as industrial and food products. When the hopper or tank trailer reaches the manufacturer's plant, the bulk commodity is unloaded. Typically this is done by pneumatically unloading the bulk commodity from the hopper into a clean and sanitary pipe line at the manufacturer's location. For this purpose, hopper tees are mounted to the discharge outlet of the hopper truck to transfer the bulk commodity by gravity flow or air pressure conveyor vibration into a vertical pipe section of the hopper tee. The hopper tee has a vertical pipe section which is connected to a transverse or horizontal pipe section allowing the outer ends of the hopper tee to be connected in the pneumatic pipe line tubing system of the manufacturer. Pneumatic conveying of the bulk commodity through the horizontal pipe section in the pipeline tubing is achieved by establishing a pressure differential in the pipeline system.

Prior art hopper tees have been constructed by welding vertical and horizontal pipe sections together. With prior art hopper tees constructed in this manner, the welded areas of juncture will create rough and irregular internal wall surfaces, which impede the flow of product or commodity through the hopper tee. More specifically, the welds in the area of juncture between the vertical and horizontal pipe section within the hopper tee produce rough and irregular internal wall surfaces, which can substantially impede product flow. Also, hopper tees constructed in this manner have a much higher incidence of product hang-up in the rough and irregular internal wall surface areas causing product contamination between loads. Moreover, abrasive dry bulk commodities, such as sand, cause premature wear-through in the hopper tee in the welded areas of juncture between the vertical and horizontal pipe sections. Furthermore, an abrasive bulk commodity may work through the entire hopper tee, especially at areas around the juncture of the vertical and horizontal pipe sections.

Hopper tees, as well as the piping connected to the hopper tee, are typically made from schedule 80 heavy steel in order to resist the abrasive bulk commodity. My prior art hopper tee, disclosed in U.S. Pat. No. 4,848,396, alleviates some of the problems associated with other prior art hopper tees. My prior art hopper tee particularly eliminates the problem associated with rough or exposed welds between the vertical and horizontal pipes. That novel design for a cast hopper tee helps eliminate both slow or impeded emptying of a hopper as well as the problem with premature wear of the hopper tee.

However, by using a hopper tee having a flared vertical pipe section at the juncture resulting in an elliptical opening from the vertical pipe into the horizontal pipe would allow more product to enter into a smaller diameter horizontal pipe. Also, by spreading the area of flow from the vertical pipe to the horizontal pipe there would be a reduction in the amount of friction and back pressure which effects unloading rates and premature wear in the hopper tee. Moreover, by designing the hopper tee with wear saddles that extend from horizontal lines up vertical lines on both sides of the juncture of the flared section of the vertical pipe with the horizontal pipe, there is created an area of increased thickness that resists wear through abrasion.

SUMMARY OF THE INVENTION

It is a principal object of the present invention to provide a cast hopper tee with a vertical pipe that is flared at the juncture of the vertical and horizontal pipes thereby creating an elliptical opening from the vertical pipe into the horizontal pipe.

Another object of the present invention is to have wear saddles formed of metal at the lateral sloping junctures of the flared vertical pipe and horizontal pipe to double the wall thickness of the hopper tee at that juncture to prevent premature wear by abrasive bulk materials.

Still another object of the present invention is to provide a hopper tee which provides even and constant product flow throughout the vertical and horizontal pipe sections of the hopper tee.

Another object of the present invention is to provide a hopper tee which eliminates problems associated with rough and irregular internal wall surfaces that cause potential product contamination of subsequent commodities unloaded through the hopper tee.

Yet another object of the invention is to provide a hopper tee which is economical to manufacture, sturdy, easy to unload, requires little or no maintenance and is well-suited for its intended purposes.

Briefly stated, an integral one-piece cast hopper tee of the present invention includes a first hollow pipe section having an outwardly directed flange at an upper end thereof for the attachment to the bottom of the hopper truck. The first hollow pipe section includes an internal cylindrical wall of predetermined diameter. The internal cylindrical wall terminates in an elliptically flared wall of a substantially greater interior circumference that of the cylindrical wall. A second hollow pipe section extends generally transversely relative to the first hollow pipe section and is integrally attached thereto at the lower end thereof. The second hollow pipe section extends on opposite sides of the first hollow pipe section and terminates at opposite free ends for attachment to a pipeline tubing. The area of juncture between the first hollow pipe section and the second hollow pipe section is of the approximate circumference as the circumference of the elliptically flared section of the vertically extending pipe section. The internal area of juncture between the first and second pipe sections is smooth and uninterrupted. A pair of wear saddles, one on each side of the external juncture of the flared section of the first hollow pipe section and the second hollow pipe section create wear resistant areas having approximately double the wall thickness of either the pipe sections.

DESCRIPTION OF THE PREFERRED EMBODIMENT

Figure 6:
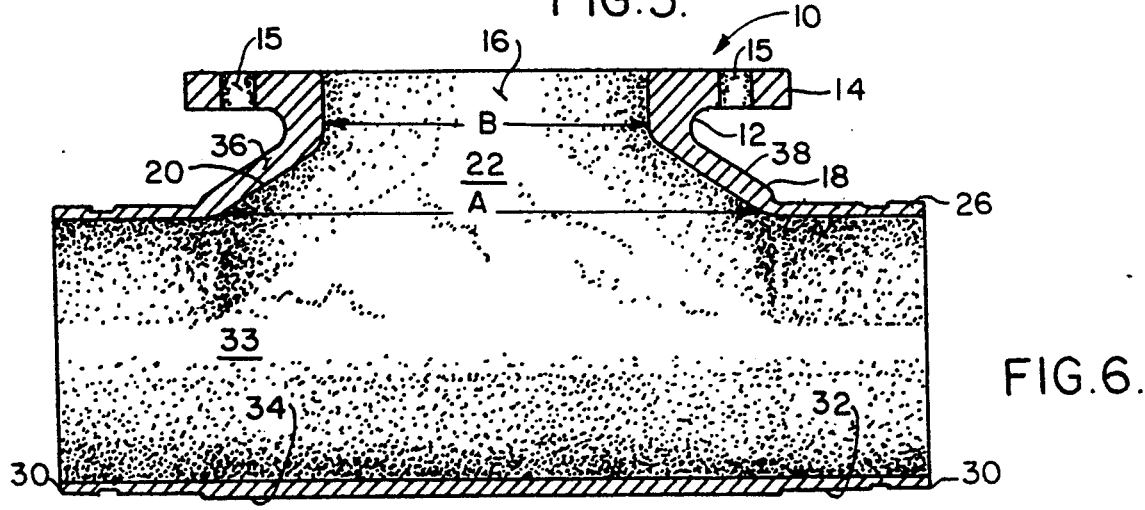
FIG. 6 is a cross sectional view taken along lines 6—6 of FIG. 2.

A cast hopper tee constructed in accordance with the present invention is indicated generally by reference numeral 10. Cast hopper tee 10 includes a first or vertical hollow pipe section 12 having a laterally outwardly directed flange 14 with a plurality of mounting holes 15 formed therethrough, at an upper end thereof for attachment to the bottom of a hopper truck (not shown). The first hollow pipe section 12 is generally vertically directed and includes an upper internal cylindrical wall 16 of a predetermined internal circumference. The size of the internal cylindrical wall 16 of the first pipe section may be varied to suit the hopper size and the particular environment in which it is used. First hollow pipe section 12 terminates in the flared wall section 18. Flared section 18 has an internal tapered, elliptical wall 20. As can be seen in FIG. 6, there is a smooth transition between wall 16 and wall 20. Wall 16 and wall 20 define a generally frusto-elliptical chamber 22.

A second or horizontal hollow pipe section 26 extends generally transverse relative to the first hollow pipe section and is integrally attached to flared section 18 creating a generally elliptical opening 28 between the respective pipe sections at the juncture of the pipe sections. Second hollow pipe section 26 is generally horizontally directed and extends on opposite sides of first hollow pipe section terminating at opposite free ends 30, 30 for attachment to a pipe line tubing (not shown) by suitable means. Second pipe section 26 has a generally cylindrical wall 32 having a cylindrical internal chamber 33. Wall 32 has a wear area 34 of wall section of substantially greater thickness than wall 32. Wear area 34 is diametrically opposed to elliptical opening 28.

A pair of integral wear saddles 36 and 38 are formed from the walls of the respective pipes. The saddles 36 and 38 straddle the lateral juncture of the respective pipes. As best illustrated in FIG. 6, wear saddles 36 and 38 effectively increase the thickness of wall 20 at the lateral junctures.

Figure 1:
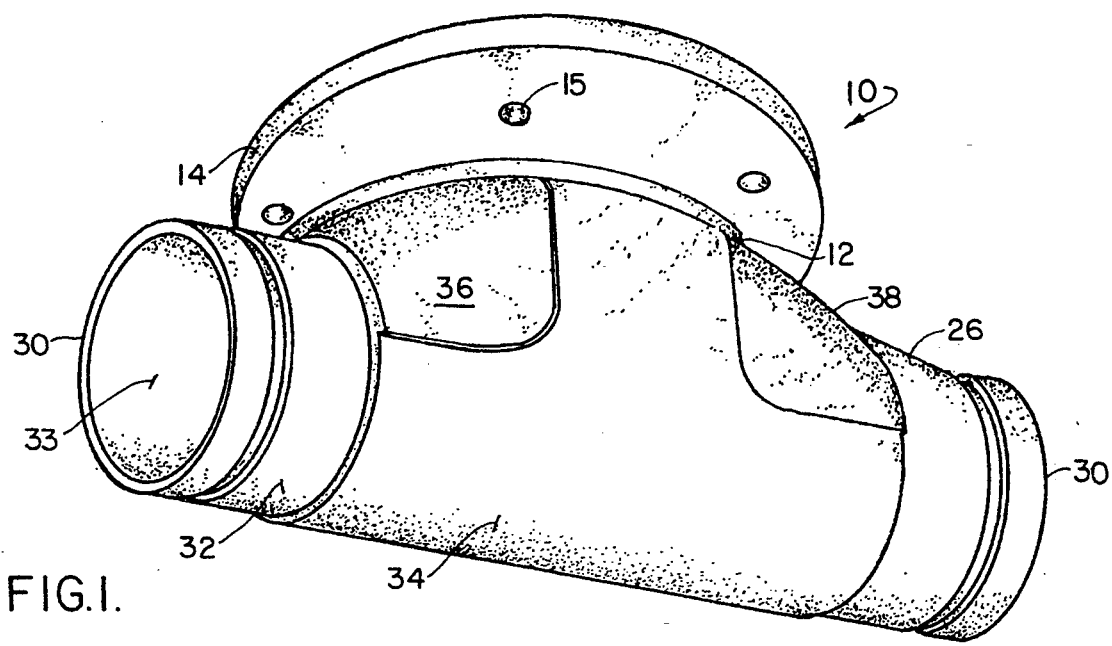
FIG. 1 is a perspective view of the cast hopper tee of the present invention.
Figure 2:
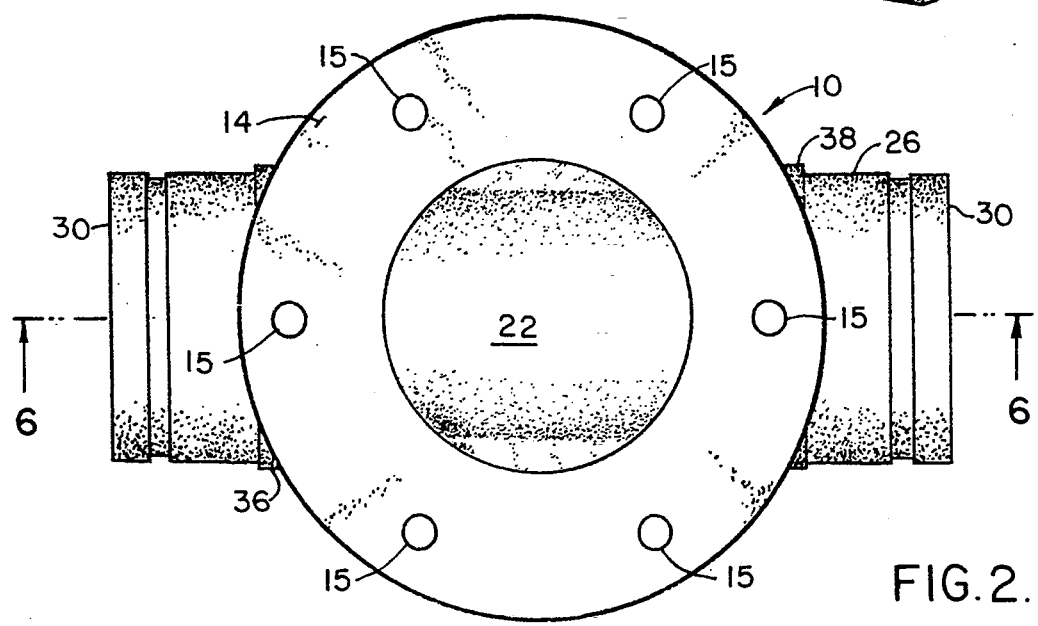
FIG. 2 is a top plan view of the cast hopper tee of the present invention.
Figure 3:
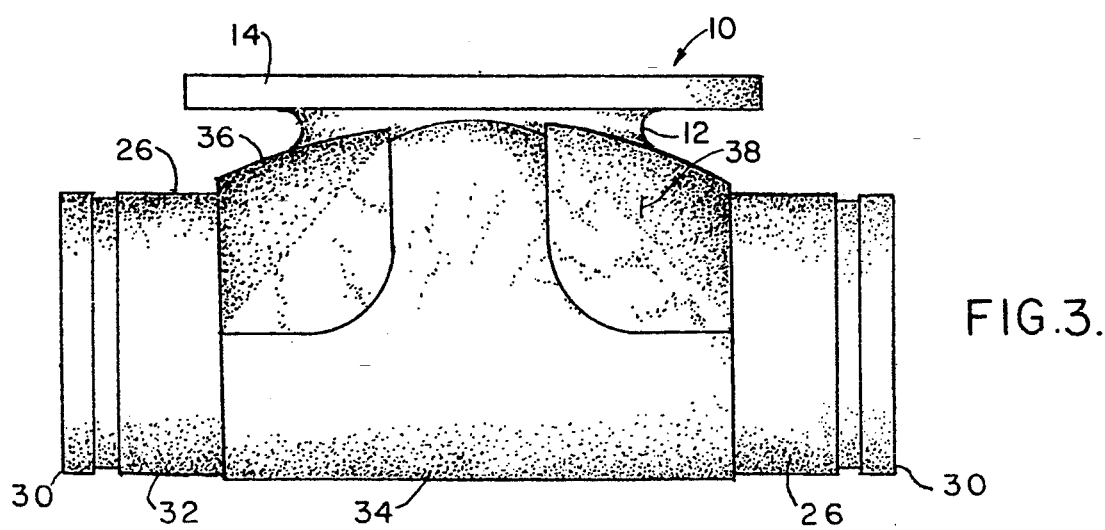
FIG. 3 is a side elevational view of the cast hopper tee of the present invention.
Figure 4:
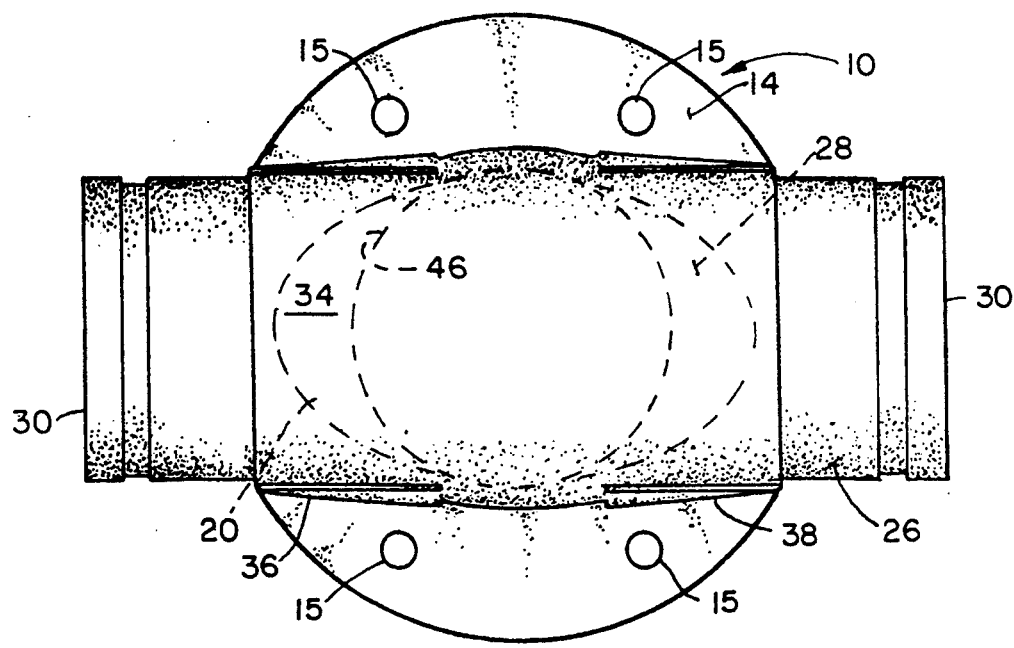
FIG. 4 is a bottom plan view of the hopper tee of the present invention.

Other than being cast as an integral one-piece cast hopper tee 10, preferably of aluminum, the construction and configuration of hopper tee 10 is specifically different from prior art hopper tees as will now be described. The areas of juncture between flared section 18 and hollow pipe section 26 create a generally elliptical shape opening 28 as previously described. Opening 28 is substantially greater in size than a conventional circular opening formed at the juncture of the vertical and horizontal pipes in prior art hopper tees. As can be seen in FIGS. 4 and 6, the circumference A of a wall 20 at the juncture with pipe 26 is significantly greater than circumference B of inner cylindrical wall 16. Furthermore, frusto-elliptical chamber 22 allows the introduction of a greater amount of bulk material than a conventional hopper tee. Moreover, the smooth and uninterrupted transitional surfaces of walls 16 and 20 allow complete and continuous flow of product through the hopper tee without hang-up.

Figure 5:
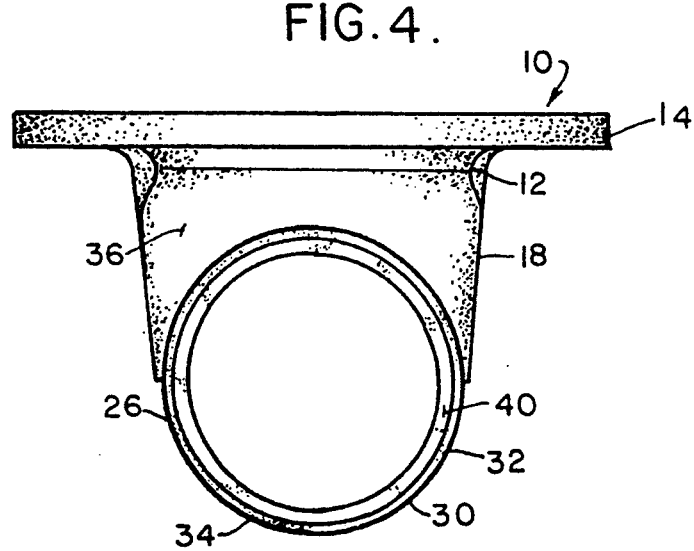
FIG. 5 is an end plan of the hopper tee of the present invention.

Reference is now made to FIG. 5 which shows the cast hopper tee 10. As constructed in accordance with the previous description and further including an inner molded lining 40. The inner molded lining is preferably made from a urethane elastomer that is molded in-situ within cast hopper tee 10. A supplemental mold of both vertical and horizontal segments is located within hollow pipe sections 12 and 26, respectively, and then the urethane is injection molded in place. This provides a very smooth transitional liner between these pipe sections, and prevents hang up of any product during flow of product through the hopper tee. Liner 40 provides not only low coefficient of friction, but is has good abrasion resistance.

In view of the above, it will be seen that the several objects of the invention are achieved and other advantageous results are obtained.

As various changes could be made in the above construction without departing from the scope of the invention, it is intended that all matter contained in the above description or shown in the accompanying drawings shall be interpreted as illustrative and not in a limiting sense.

What is claimed:

1. An integral one-piece cast hopper tee comprising:
   a first hollow pipe section having a lateral outwardly directed flange at an upper end thereof for attachment to the bottom of a hopper, said first hollow pipe section having a cylindrical section extending downwardly from said flange, said cylindrical section having an integral cylindrical wall of predetermined internal circumference, said cylindrical section having a length extending vertically within the first hollow pipe section, said cylindrical section terminating in a flared section internally of said first hollow pipe section, said flared section having an internal circumference substantially greater than the internal circumference of the said cylindrical section of the first hollow pipe section;
   a second hollow pipe section extending generally transversely relative to said first hollow pipe section and being integrally attached through casting to the first hollow pipe section at the flared section thereof, said second hollow pipe section extending on opposite sides beyond said first hollow pipe section and terminating at opposite free ends for attachment to pipeline tubing, said second hollow pipe section having an internal cylindrical wall extending for some horizontal length approximately of the same predetermined internal circumference as that of said cylindrical section of said first hollow pipe section;
   wear resistant means integrally formed between the vertically extending first hollow pipe section and the horizontally extending second hollow pipe section so as to increase the wall thickness of the vertically extending pipe section and said flared section at the juncture with the horizontally extending pipe section; and said flared section of said first hollow pipe section is elliptically formed, and providing a substantially longitudinally flattened frusto-elliptical area of smooth transition between said first and second hollow pipe sections.

2. The hopper tee of claim 1 including an inner molded lining molded in situ within both the first and second hollow pipe sections, said lining having a low coefficient of friction which conforms to the internal walls of said sections, including the substantially longitudinally flattened frusto-elliptical area of transition between said first and second hollow pipe sections.

3. The hopper tee of claim 1 further comprising an integral reinforced wall on said second hollow pipe section, said reinforced wall integrally formed on a side opposite said juncture of said first and said second hollow pipe sections.

4. The invention of claim 3 wherein said one-piece cast hopper tee is formed from aluminum.

* * * * *